(12) United States Patent
Coccia

(10) Patent No.: US 6,939,838 B2
(45) Date of Patent: Sep. 6, 2005

(54) STABILIZED LIQUID COMPOSITIONS CONTAINING PEROXIDES

(75) Inventor: Maria Gabriella Coccia, Bergamo (IT)

(73) Assignee: 3V Sigma S.p.A., Milan (IT)

( * ) Notice: Subject to any disclaimer, the term of this patent is extended or adjusted under 35 U.S.C. 154(b) by 433 days.

(21) Appl. No.: 10/265,584

(22) Filed: Oct. 8, 2002

(65) Prior Publication Data

US 2003/0114334 A1 Jun. 19, 2003

(30) Foreign Application Priority Data

Oct. 9, 2001 (IT) ..................................... MI2001A2081

(51) Int. Cl.$^7$ .............................................. C11D 3/395

(52) U.S. Cl. ..................... 510/372; 510/375; 510/286

(58) Field of Search ................................ 510/286, 372, 510/375

(56) References Cited

U.S. PATENT DOCUMENTS

| | | |
|---|---|---|
| 4,238,192 A | 12/1980 | Kandathil |
| 4,696,757 A | 9/1987 | Blank et al. |
| 4,788,052 A | 11/1988 | Ng et al. |
| 4,839,156 A | 6/1989 | Ng et al. |
| 4,839,157 A | 6/1989 | Ng et al. |
| 4,900,468 A | 2/1990 | Mitchell et al. |
| 5,102,575 A | 4/1992 | Lanniel et al. |
| 5,264,143 A | 11/1993 | Boutique |
| 5,419,847 A | 5/1995 | Showell et al. |
| 6,083,422 A | 7/2000 | Ambuter et al. |

FOREIGN PATENT DOCUMENTS

| | | |
|---|---|---|
| EP | 0351772 A2 | 1/1990 |
| GB | 2347928 A | 9/2000 |

*Primary Examiner*—Yogendra N. Gupta
(74) *Attorney, Agent, or Firm*—Birch, Stewart, Kolasch & Birch, LLP

(57) ABSTRACT

Liquid compositions containing hydrogen peroxide, precursors thereof or peroxides are stabilised by addition of sterically hindered amines, in particular of 2,2,6,6-tetrasubstituted piperidines.

16 Claims, No Drawings

STABILIZED LIQUID COMPOSITIONS CONTAINING PEROXIDES

FIELD OF THE INVENTION

The present invention refers to liquid compositions for domestic or industrial use containing hydrogen peroxide, hydrogen peroxide precursors or peroxides, for bleaching and sanitization of tissues and surfaces.

BACKGROUND OF THE INVENTION

Liquid compositions containing agents for chemical bleaching and disinfection are widely used for household or industrial cleaning, for personal cleansing products and in the pharmaceutical industry.

These compositions can contain, as active agents, hypochlorous acid salts, or hydrogen peroxide or peroxide precursors thereof.

Hypochlorite-based compositions have been the most used insofar due to their efficacy and low cost. Nevertheless, peroxides-based compositions are less aggressive and do not develop the unpleasant smell of chlorine or chloramines, therefore they are preferred for household use and personal hygiene.

The activity of hypochlorites- and peroxides-based compositions, i.e. their content of active chlorine or active oxygen, tends to decrease in time, which affects, as a consequence, other characteristics, such as colour and cleaning power. Modifications of the rheologic behaviour can also be observed if, as in most cases, rheologic modificators are contained for regulating the viscosity of the compositions.

The above drawbacks, which have prevented a wider diffusion on the market, occur mainly in hydrogen peroxide- or peroxides-based compositions, in particular at alkaline pH, where they show the most favourable detergent properties.

The cause of this instability is due to Fe+++, Cu++ and other heavy metal cations, which catalyse peroxide decompositions; since these cations are active even at p.p.m. concentration, it is difficult to keep them under control.

Several patents disclose stabilised compositions characterised in that the pH is carefully maintained under 7, in order to prevent instability.

In this respect, U.S. Pat. Nos. 4,839,156; 4,788,052; 4,839,157; 4,696,757; 4,238,192; 5,419,847 can be considered.

The use of more or less effective stabilising systems for obtaining compositions that are stable at alkaline pH is disclosed in other patents, such as U.S. Pat. No. 5,264,143, which discloses the use of phosphonate chelating agents; U.S. Pat. No. 4,900,468, which discloses the use of chelating agents in combination with substituted hydroxy benzenes as free radicals inhibitors; U.S. Pat. No. 6,083,422, which claims the use of rheologic stabilisers consisting of a series of variously substituted benzenes.

SUMMARY OF THE INVENTION

The object of the present invention is a method for stabilising hydrogen peroxide- or peroxides-based liquid compositions, in particular for stabilising compositions that contain, in addition to hydrogen peroxide or peroxides, one or more further ingredients such as surfactants, viscosity- and rheology-regulating polymers, pH regulating agents, optical bleaching agents, dyes, perfumes.

More particularly, the present invention relates to compositions stabilised by addition of stabilising agents belonging to the sterically hindered amines class, containing the group:

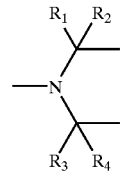

Among these, particularly interesting are compounds of formula I:

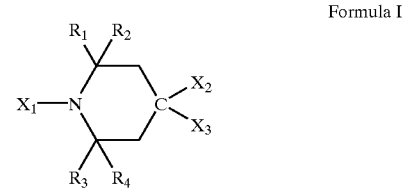

Formula I wherein
$R_1$, $R_2$, $R_3$, $R_4$, which can be the same or different, are methyl or ethyl;
$X_1$ is H, methyl, ethyl, an oxygen atom, a —OH or $OR_5$ group, wherein $R_5$ is a $C_1$–$C_4$ straight or branched alkyl or cyclohexyl;
$X_2$ is hydrogen and $X_3$ is —OH or —$NHR_5$, wherein $R_5$ has the above described meaning;
or $X_2$ and $X_3$ taken together are an oxygen atom.

A further object of the invention are hydrogen peroxide- or peroxides-based liquid compositions stabilised as described above.

DETAILED DISCLOSURE OF THE INVENTION

According to the invention, hydrogen peroxide- or peroxides-based liquid compositions for household or industrial cleaning and sanitization of tissues or surfaces are stabilised by addition of compounds of formula I in amounts ranging from 0.001% to 5%, in order to preserve the activity of peroxide groups and the general properties of the compositions, in particular viscosity and rheologic characteristics, when said compositions contain polymeric viscosity regulating agents. Compounds of formula I are easily water-soluble and can be added as such to the compositions of the present invention or can be pre-diluted in a suitable amount of water.

The hydrogen peroxide content ranges from 0.5% to 15%, preferably from 3% to 10%. Preferred stabilising agents according to the invention are compounds of formula I wherein $R_1$, $R_2$, $R_3$, $R_4$ are methyl; $X_1$ is an oxygen atom or OH; among these, particularly preferred are those wherein $X_1$ is oxygen, $X_2$ is H and $X_3$ is —OH.

The pH can range from 1 to 10 and can be adjusted as desired by addition of alkaline substances, such as sodium or potassium bicarbonates, carbonates, hydroxides, phosphates, pyrophosphates, silicates or alkanolamines or acidic substances such as hydrochloric, sulfuric, phosphoric, boric acids or organic acids such as acetic, oxalic, citric, tartaric, formic and lactic acids. Formulations with slightly acidic pH are usually preferred.

Other generally used optional ingredients are surfactants, viscosity regulators, builders and minor components, such as optical bleaching agents, sequestering agents, peroxides activators, abrasive substances, dyes and perfumes.

Anionic, non ionic, amphoteric surfactants or mixtures thereof can be used for increasing the wetting properties and the cleaning power of the bleaching compositions.

Suitable anionic surfactants are alkyl ethers sulfates, alkyl ethers phosphates, alkyl aryl sulfonates, fatty acids soaps, alkyl sulfates and sulfonated paraffins. Examples of non ionic surfactants are ethoxylated alcohols, ethoxylated alkylphenols, ethoxylated fatty acids, esters of sugars, alkanolamides and ethylene oxide—propylene oxide block copolymers.

Examples of amphoteric surfactants are ethoxylated amines, amine oxides, imidazolines. Nevertheless, the kind of surfactant is not critical for the invention.

Rheology regulating agents are usually polymers used from 0.1% to 3% on the bleaching composition weight. These polymers can be non-associative thickening agents, such as homopolymers or copolymers of carboxylic acids, or of unsaturated anhydrides such as acrylic and methacrylic acid, maleic anhydride or esters thereof with free or salified carboxy groups, both in the form of powder and emulsion or dispersion, optionally water-soluble after alkalinization, or associative thickening agents such as alkali-soluble hydrophobically modified acrylic emulsions or hydrophobically modified polymeric polyols or modified urethanic polymers or mixtures thereof. Homo- and co-polymers are usually cross-linked so as to give proper rheologic behaviour to the compositions.

Polymers as above described are commercially available under the trademarks Carbopol, Ultrez, Acrysol, Polygel, Synthalen, Stabylen.

Builders are materials which reduce the active concentration of calcium and magnesium ions. Any builders known in the art can be used, such as trisodium phosphate, tetrasodium pyrophosphate, sodium tripolyphosphate, sodium silicates or the corresponding potassium salts.

Representative examples of chelating substances are alkali salts of nitrilotriacetic acid, ethylenediamino tetraacetic acid, diethylene triamino pentacetic acid and aminopolyphosphonates.

Among optical bleaching agents, stilbentriazinic and di-styryl-diphenyl derivatives are preferred.

Experimental Section

To better evidence the advantages of the present invention, some examples of the claimed stabilised cleaning compositions are reported hereinbelow.

All percentages are given by weight; viscosity was measured with a Brookfield RVT DV1 viscosimeter at 20 r.p.m. and 25° C. and is expressed in centipoise.

Hydrogen peroxide content was measured according to the iodometric method.

EXAMPLE 1

Compositions containing about 3% hydrogen peroxide were viscosized using a cross-linked polyacrylic acid (Polygel® DA) and stabilised with 4-hydroxy-2,2,6,6-tetramethylpiperidinyl-N-oxy (Registry number 2226-96-2), which corresponds to the compound of formula (I) wherein $X_1$=O, $X_2$=H, $X_3$=OH, $R_1$=$R_2$=$R_3$=$R_4$=—$CH_3$ (hereinafter referred to as TMP-NO) or with BHT (2,6-di-tert-butyl-4-methyl-phenol) a known stabilising agent. The test compositions were prepared dispersing first Polygel DA in demineralized water under vigorous stirring and then adding in succession a polyphosphonate chelating agent (DETPP= diethylenetriamino pentaphosphonic acid), the stabilising agent 4-hydroxy-2,2,6,6-tetramethylpiperidinyl-N-oxy, hydrogen peroxide and finally the two surfactants. The pH was adjusted to 4.5 to obtain a viscous gel with optimal transmittance. Due to its water-insolubility, the stabilising agent BHT was previously dissolved in the surfactant Lutensol® AO7.

Viscosity and hydrogen peroxide contents were determined after 8 hours. The compositions, sealed in polyethylene containers, were then placed in a static dryer thermostatized at 40° C., for stability controls. Results are reported in table 1.

| CLEANING COMPOSITION | % WEIGHT |
| --- | --- |
| Demineralized water | q.s. to 100% |
| Polygel ® DA | 0.55 |
| DETTP | 0.15 |
| Stabilising agent | 0.02 |
| 35% Hydrogen peroxide | 10 |
| Zetesol ® LES 2A | 7.0 |
| Lutensol ® AO7 | 0.5 |
| Sodium hydroxide | To pH 4.5 |

TABLE 1

| | Reference (blank) | Stabilising agent TMP-NO | Stabilising agent BHT |
| --- | --- | --- | --- |
| Starting viscosity | 690 | 670 | 940 |
| Starting $H_2O_2$ | 3.47 | 3.49 | 3.47 |
| After 1 week at 40° C. | | | |
| viscosity | 730 | 730 | 980 |
| $H_2O_2$ | 3.45 | 3.48 | 3.45 |
| After 4 weeks at 40° C. | | | |
| viscosity | 770 | 760 | 950 |
| $H_2O_2$ | 3.41 | 3.47 | 3.43 |
| After 8 weeks at 40° C. | | | |
| viscosity | 550 | 780 | 950 |
| $H_2O_2$ | 3.33 | 3.44 | 3.40 |
| After 12 weeks at 40° C. | | | |
| viscosity | 400 | 800 | 800 |
| $H_2O_2$ | 3.20 | 3.42 | 3.37 |

EXAMPLE 2

The following compositions were prepared according to the procedure of example 1. Stability test results are reported in table 2.

| CLEANING COMPOSITION | % WEIGHT |
| --- | --- |
| Demineralized water | q.s. to 100% |
| Polygel ® DA | 0.55 |
| DETTP | 0.15 |
| Stabilising agent | 0.02 |
| 35% Hydrogen peroxide | 10 |
| Zetesol ® LES 2A | 3.5 |
| Dodecylbenzenesulfonic acid | 1.0 |
| Lutensol ® AO7 | 0.5 |
| Sodium hydroxide | To pH 4.5 |

TABLE 2

| | Reference (blank) | Stabilising agent TMP-NO | Stabilising agent BHT |
|---|---|---|---|
| Starting viscosity | 670 | 710 | 780 |
| Starting $H_2O_2$ | 3.48 | 3.51 | 3.49 |
| After 1 week at 40° C. | | | |
| viscosity | 710 | 810 | 810 |
| $H_2O_2$ | 3.44 | 3.51 | 3.48 |
| After 4 weeks at 40° C. | | | |
| viscosity | 830 | 830 | 840 |
| $H_2O_2$ | 3.39 | 3.50 | 3.46 |
| After 8 weeks at 40° C. | | | |
| viscosity | 500 | 830 | 850 |
| $H_2O_2$ | 3.30 | 3.46 | 3.40 |
| After 12 weeks at 40° C. | | | |
| viscosity | 400 | 850 | 700 |
| $H_2O_2$ | 3.18 | 3.43 | 3.36 |

EXAMPLE 3

The following compositions were prepared according to the procedure of example 1. Stability test results are reported in table 3.

| CLEANING COMPOSITION | % WEIGHT |
|---|---|
| Demineralized water | q.s. to 100% |
| Polygel ® DA | 0.55 |
| DETTP | 0.15 |
| Stabilising agent | 0.02 |
| 35% Hydrogen peroxide | 10 |
| Dodecylbenzenesulfonic acid | 2.0 |
| Lutensol ® AO7 | 0.5 |
| Sodium hydroxide | To pH 4.5 |

TABLE 3

| | Reference (blank) | Stabilising agent TMP-NO | Stabilising agent BHT |
|---|---|---|---|
| Starting viscosity | 710 | 710 | 700 |
| Starting $H_2O_2$ | 3.52 | 3.54 | 3.52 |
| After 1 week at 40° C. | | | |
| viscosity | 750 | 830 | 740 |
| $H_2O_2$ | 3.49 | 3.50 | 3.50 |
| After 4 weeks at 40° C. | | | |
| viscosity | 760 | 860 | 750 |
| $H_2O_2$ | 3.48 | 3.48 | 3.49 |
| After 8 weeks at 40° C. | | | |
| viscosity | 500 | 860 | 700 |
| $H_2O_2$ | 3.40 | 3.46 | 3.43 |
| After 12 weeks at 40° C. | | | |
| viscosity | 400 | 850 | 650 |
| $H_2O_2$ | 3.30 | 3.43 | 3.39 |

EXAMPLE 4

The procedure of example 1 was repeated using different amounts of TMP-NO (0.01-0.02-0.05) and of three stabilising agents corresponding to the following compounds of formula (I):

Stabilising Agent A 2,2,6,6-tetramethyl-4-piperidinol (Registry number 2403-88-5)

corresponding to the compound of formula (I) in which $X_1$=H, $X_2$=H, $X_3$=OH, $R_1$=$R_2$=$R_3$=$R_4$=—$CH_3$ Stabilising Agent B 1,4-di-hydroxy-2,2,6,6-tetramethylpiperidine (Registry number 3637-10-3)

corresponding to the compound of formula (I) in which $X_1$=—HO, $X_2$=H, $X_3$=OH, $R_1$=$R_2$=$R_3$=$R_4$=—$CH_3$ Stabilising Agent C 2,2,6,6-tetramethylpiperidine-N-oxy (Registry number 2896-70-0)

corresponding to the compound of formula (I) in which $X_1$=O, $X_2$ and $X_3$ taken together=O, $R_1$=$R_2$=$R_3$=$R_4$=—$CH_3$

| CLEANING COMPOSITION | % WEIGHT |
|---|---|
| Demineralized water | q.s. at 100% |
| Polygel ® DA | 0.65 |
| DETTP | 0.15 |
| Stabilising agent | 0.01–0.02–0.05 |
| 35% Hydrogen peroxide | 20 |
| Zetesol ® LES 2A | 7.0 |
| Lutensol ® AO7 | 0.5 |
| Sodium hydroxide | To pH 4.5 |

Stability tests results are reported in tables 4, 5, 6, 7.

TABLE 4

| Stabilising agent A | Reference (blank) | 0.01% | 0.02% | 0.05% |
|---|---|---|---|---|
| Starting viscosity | 1160 | 1120 | 1180 | 1310 |
| Starting $H_2O_2$ | 7.14 | 7.15 | 7.15 | 7.16 |
| After 1 week at 50° C. | | | | |
| viscosity | 1060 | 1380 | 1400 | 1400 |
| $H_2O_2$ | 7.03 | 7.13 | 7.15 | 7.14 |
| After 4 weeks at 50° C. | | | | |
| viscosity | 190 | 1320 | 1360 | 1400 |
| $H_2O_2$ | 6.83 | 7.13 | 7.12 | 7.13 |
| After 8 weeks at 50° C. | | | | |
| viscosity | 1 | 50 | 150 | 1360 |
| $H_2O_2$ | 6.65 | 6.90 | 7.03 | 7.10 |
| After 12 weeks at 50° C. | | | | |
| viscosity | // | 1 | 1 | 1100 |
| $H_2O_2$ | | 6.12 | 6.23 | 7.06 |

TABLE 5

| Stabilising agent B | Reference (blank) | 0.01% | 0.02% | 0.05% |
|---|---|---|---|---|
| Starting viscosity | 1160 | 1120 | 1140 | 1250 |
| Statrting $H_2O_2$ | 7.14 | 7.14 | 7.17 | 7.11 |
| After 1 week at 50° C. | | | | |
| viscosity | 1060 | 1290 | 1310 | 1510 |
| $H_2O_2$ | 7.03 | 7.12 | 7.15 | 7.10 |

TABLE 5-continued

| Stabilising agent B | Reference (blank) | 0.01% | 0.02% | 0.05% |
|---|---|---|---|---|
| After 4 weeks at 50° C. | | | | |
| viscosity | 190 | 1330 | 1380 | 1410 |
| $H_2O_2$ | 6.83 | 7.10 | 7.13 | 7.10 |
| After 8 weeks at 50° C. | | | | |
| viscosity | 1 | 1500 | 1560 | 1610 |
| $H_2O_2$ | 6.65 | 7.08 | 7.09 | 7.07 |
| After 12 weeks at 50° C. | | | | |
| viscosity | // | 1200 | 1400 | 1560 |
| $H_2O_2$ | | 6.99 | 7.02 | 7.02 |

TABLE 6

| Stabilising agent TMP-NO | Reference (blank) | 0.01% | 0.02% | 0.05% |
|---|---|---|---|---|
| Starting viscosity | 1160 | 1110 | 1110 | 1060 |
| Starting $H_2O_2$ | 7.14 | 7.14 | 7.16 | 7.16 |
| After 1 week at 50° C. | | | | |
| viscosity | 1460 | 1310 | 1300 | 1340 |
| $H_2O_2$ | 7.03 | 7.13 | 7.15 | 7.14 |
| After 4 weeks at 50° C. | | | | |
| viscosity | 190 | 1380 | 1380 | 1340 |
| $H_2O_2$ | 6.83 | 7.11 | 7.14 | 7.11 |
| After 8 weeks at 50° C. | | | | |
| viscosity | 1 | 1580 | 1600 | 1510 |
| $H_2O_2$ | 6.65 | 7.08 | 7.12 | 7.10 |
| After 12 weeks at 50° C. | | | | |
| viscosity | // | 1300 | 1460 | 1460 |
| $H_2O_2$ | | 7.03 | 7.05 | 7.04 |

TABLE 7

| Stabilising agent C | Reference (blank) | 0.01% | 0.02% | 0.05% |
|---|---|---|---|---|
| Starting viscosity | 1160 | 1050 | 1060 | 1040 |
| Starting $H_2O_2$ | 7.10 | 7.17 | 7.15 | 7.10 |
| After 1 week at 50° C. | | | | |
| viscosity | 1460 | 1200 | 1160 | 1130 |
| $H_2O_2$ | 7.08 | 7.16 | 7.14 | 7.10 |
| After 4 weeks at 50° C. | | | | |
| viscosity | 190 | 1260 | 1240 | 1200 |
| $H_2O_2$ | 6.83 | 7.14 | 7.12 | 7.09 |
| After 8 weeks at 50° C. | | | | |
| viscosity | 1 | 1200 | 1200 | 1240 |
| $H_2O_2$ | 6.65 | 7.10 | 7.11 | 7.07 |
| After 12 weeks at 50° C. | | | | |
| viscosity | // | 1 | 1 | |
| $H_2O_2$ | | 6.04 | 6.15 | |

EXAMPLE 5

Compositions containing about 3% hydrogen peroxide were viscosized using a cross-linked polyacrylic acid (Polygel® DA) and stabilysed with TMP-NO or with anisic alcohol, a stabilising agent known from the state of the art, hereinafter referred to as AA. The test compositions were prepared dispersing first Polygel DA in demineralized water under vigorous stirring and then adding in succession a sequestering agent (DETPP=diethylenetriamino pentaphosphonic acid), the stabilising agent 4-hydroxy-2,2,6,6-tetramethylpiperidinyl-N-oxy, hydrogen peroxide and finally the two surfactants. The pH was adjusted to 8 to obtain a viscous gel with optimal transmittance. Due to its water-insolubility, the stabilising agent AA was previously dissolved in the surfactant Lutensol® A07.

Viscosity and hydrogen peroxide contents were determined after 8 hours. The compositions, sealed in polyethylene containers, were then placed a static dryer thermostatized at 40° C. for stability controls. Results are reported in table 8.

| CLEANING COMPOSITION | % WEIGHT |
|---|---|
| Demineralized water | q.s. to 100% |
| Polygel ® DA | 0.65 |
| DETTP | 0.15 |
| Stabilising agent | 0.02 |
| 35% Hydrogen peroxide | 10 |
| Zetesol ® LES 2A | 7.0 |
| Lutensol ® AO7 | 0.5 |
| Sodium hydroxide | To pH 8 |

TABLE 8

| | Reference (blank) | Stabilising agent TMP-NO | Stabilising agent AA |
|---|---|---|---|
| Starting viscosity | 1050 | 1100 | 1080 |
| Starting $H_2O_2$ | 3.46 | 3.49 | 3.47 |
| After 1 week at 50° C. | | | |
| viscosity | 955 | 1260 | 1050 |
| $H_2O_2$ | 3.40 | 3.49 | 3.45 |
| After 4 weeks at 50° C. | | | |
| viscosity | 210 | 1210 | 850 |
| $H_2O_2$ | 3.28 | 3.47 | 3.40 |
| After 8 weeks at 50° C. | | | |
| viscosity | 1 | 320 | 280 |
| $H_2O_2$ | 3.22 | 3.43 | 3.30 |

What is claimed is:

1. A method for stabilizing liquid compositions containing hydrogen peroxide or peroxide-precursors thereof, for household and industrial cleaning and disinfection, wherein the compositions are added with sterically hindered amines containing the group:

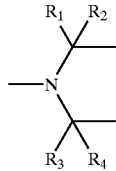

wherein $R_1$, $R_2$, $R_3$, and $R_4$, which can be the same or different, are methyl or ethyl;

in amounts ranging from 0.001% to 5% by weight.

2. Method as claimed in claim 1, wherein the hydrogen peroxide- or peroxides- liquid compositions are thickened with water-soluble or water-dispersible polymers.

3. Method as claimed in claim 1 or 2, wherein the sterically hindered amine has the general formula (I):

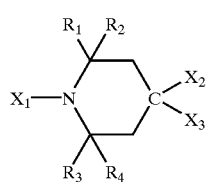

Formula I wherein $R_1$, $R_2$, $R_3$, $R_4$, which can be the same or different, are methyl or ethyl;

$X_1$ is H, methyl, ethyl, an oxygen atom, a —OH or $OR_5$ group, wherein $R_5$ is a $C_1$–$C_4$ straight or branched alkyl or cyclohexyl;

$X_2$ is hydrogen and $X_3$ is —OH or —$NHR_5$, wherein $R_5$ has the meaning above defined;

or $X_2$ and $X_3$ taken together are an oxygen atom.

4. Method as claimed in claim 3, wherein $R_1$, $R_2$, $R_3$ and $R_4$ are methyl.

5. Method as claimed in claim 4, wherein $X_1$ is oxygen, $X_2$ is hydrogen and $X_3$ is OH.

6. Method as claimed in claim 4, wherein $X_1$ and $X_3$ are OH and $X_2$ is hydrogen.

7. Method as claimed in claim 4, wherein $X_1$ is oxygen and $X_2$ and $X_3$ taken together are an oxygen atom.

8. Method as claimed in claim 1, wherein the amount of stabilizing stabilizing agent ranges from 0.005% to 3% by weight.

9. Method as claimed in claim 1, wherein hydrogen peroxide is present in amounts ranging from 0.5% to 15% by weight.

10. Method as claimed in claim 2, wherein the thickening polymer is an acrylic acid homo- or co-polymer.

11. Method as claimed in claim 10, wherein the thickening polymer is a cross0linked acrylic acid homo- or co-polymer.

12. Cleaning compositions containing hydrogen peroxide stabilized with the method of claim 1.

13. Cleaning compositions containing hydrogen peroxide as claimed in claim 12 thickened with water-soluble or water-dispersible polymers.

14. Cleaning compositions as claimed in claim 13 wherein the thickening polymers are acrylic acid homo- or co-polymers optionally cross-linked.

15. Cleaning compositions as claimed in claims 12, 13 or 14 containing from 0.01 to 3% by weight of chelating agents.

16. Cleaning compositions as claimed in claim 15 wherein the chelating agents are amino polyphosphonates.

* * * * *